UNITED STATES PATENT OFFICE.

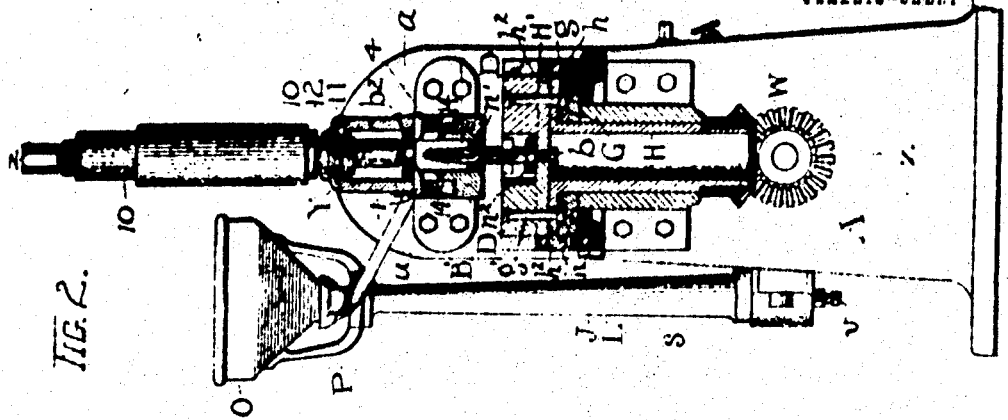
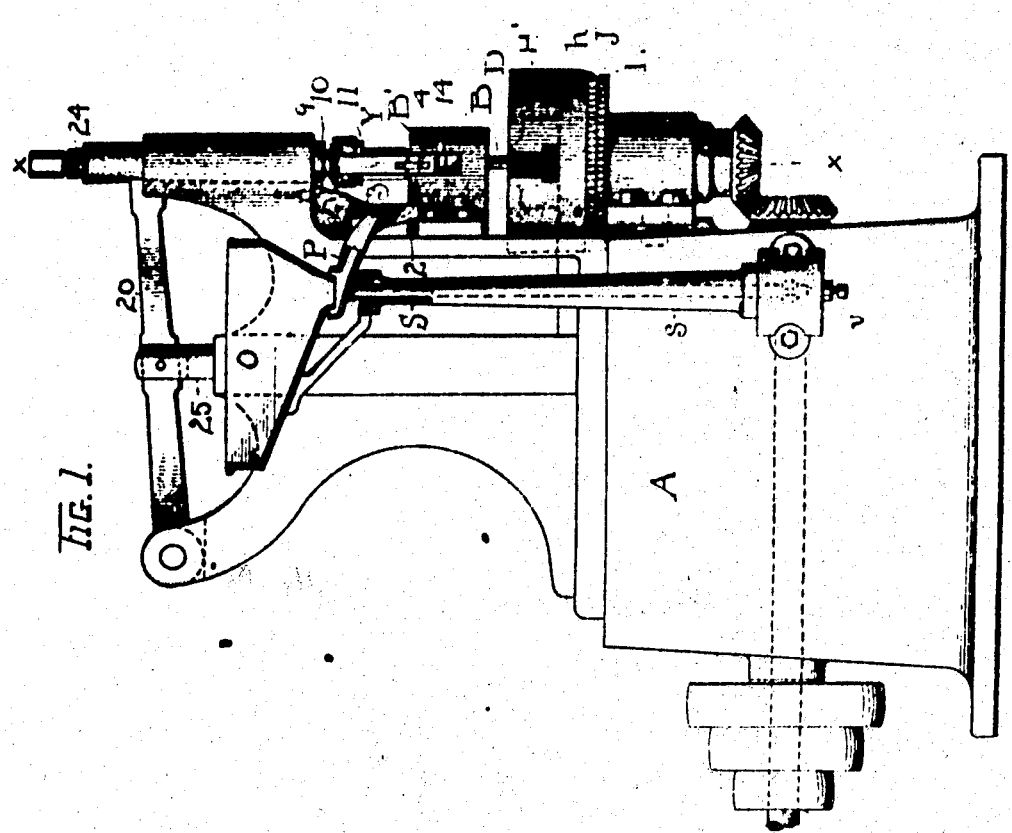

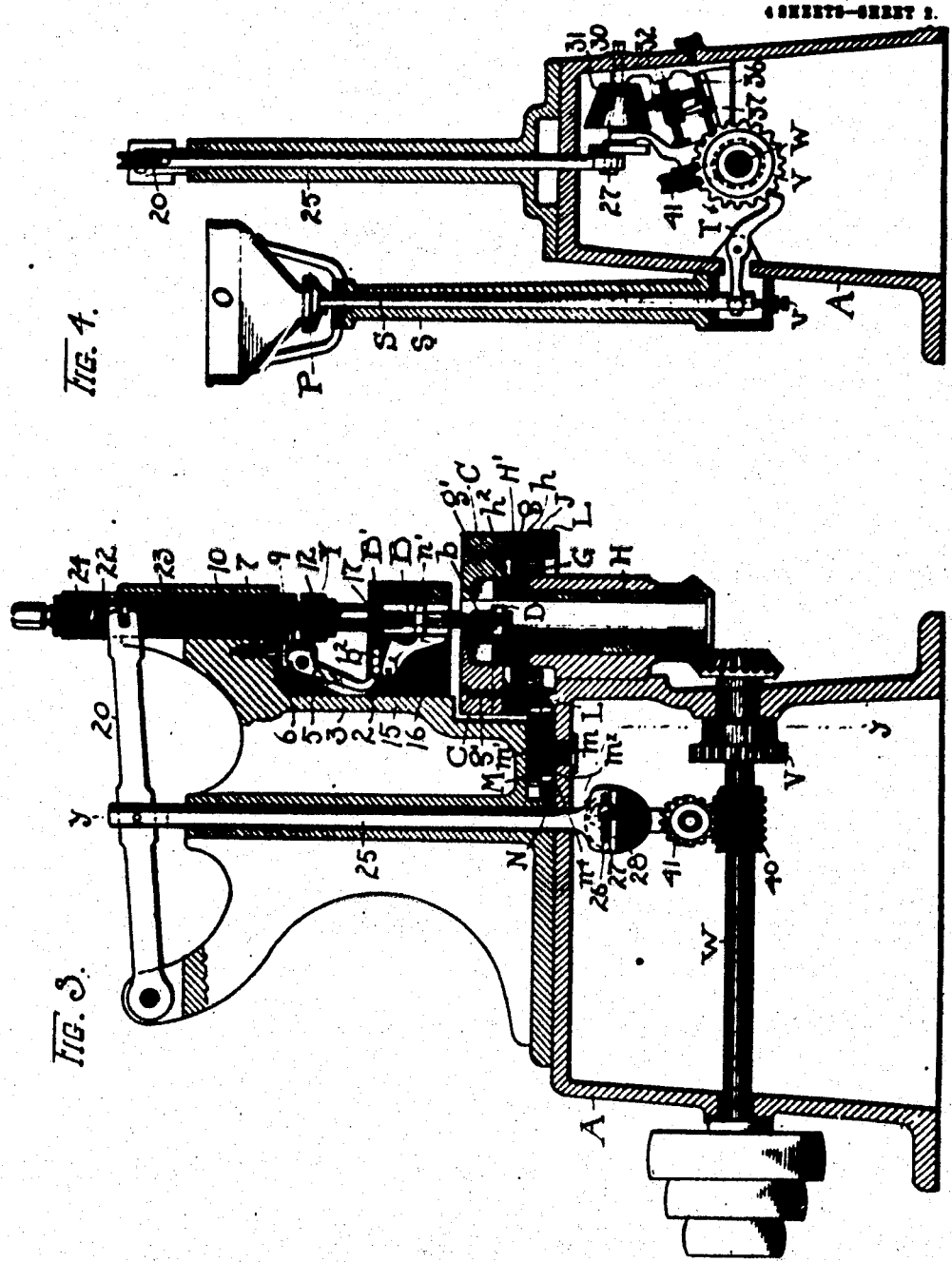

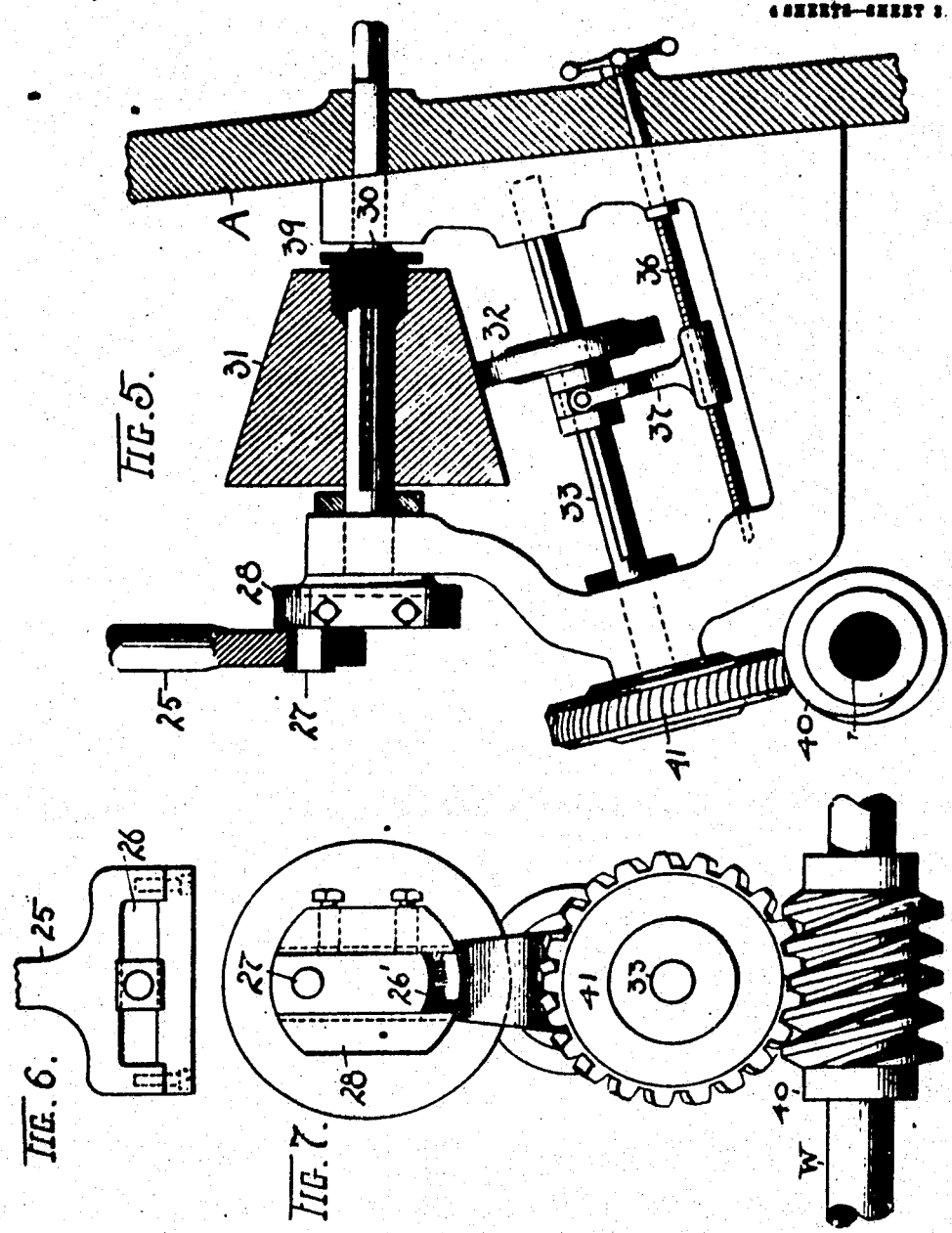

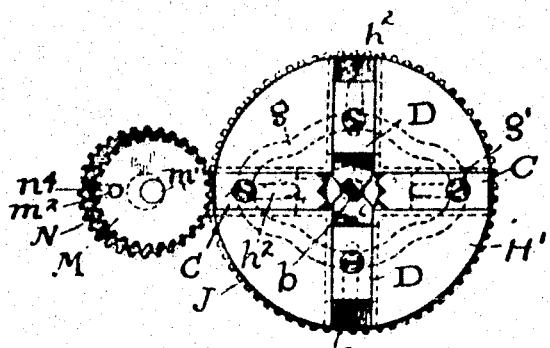

FREDERICK C. TYLER, OF CLEVELAND, OHIO.

NUT-TAPPING MACHINE.

No. 927,901.      Specification of Letters Patent.      Patented July 13, 1909.

Application filed February 8, 1904. Serial No. 192,590.

*To all whom it may concern:*

Be it known that I, FREDERICK C. TYLER, a citizen of the United States, residing at Cleveland, in the county of Cuyahoga and State of Ohio, have invented certain new and useful Improvements in Nut-Tapping Machines, and do declare that the following is a full, clear, and exact description of the invention, which will enable others skilled in the art to which it appertains to make and use the same.

My invention relates to nut tapping machines, and the invention consists in the construction, combination, and arrangement of parts substantially as shown and described and particularly pointed out in the claims.

In the accompanying drawings Figure 1 is a side elevation of the machine, with the hopper and conduit for the blanks partly sectioned vertically. Fig. 2 is a vertical sectional elevation of the machine on line $x, x$, Fig. 1 looking inward from the front of the machine. Fig. 3 is a vertical sectional elevation of the machine front to rear on a line corresponding substantially to $z, z$, Fig. 2. Fig. 4 is a sectional elevation on a line corresponding to $y, y$, Fig. 3, looking to the left or rear. Fig. 5 is an enlarged sectional elevation of the plunger operating mechanism by which the nut-blanks are fed to or upon the tap, and seen otherwise in Figs. 3 and 4, and Fig. 6 is an elevation of the lower portion of the connecting rod and wrist-pin for actuating the plunger-arm, and Fig. 7 is a side elevation of mechanism shown in Fig. 5. Fig. 8 is a plan view of the radially disposed chuck-jaws showing the upper jaws at right and left open, and the lower jaws at top and bottom closed, and the differential gears indirectly associated therewith at the left of the figure. Fig. 9 is a plan view of the jaws showing both sets closed. Fig. 10 is a cross section of the two differential gears shown at the left in Fig. 8, and Fig. 11 is a plan view of parts on a line corresponding to $a, a$, Fig. 2, showing a nut-blank in the center.

As thus shown A represents the supporting base or frame of the machine, which may be in two or more parts and preferably of cast metal. In this instance the said frame is preferably constructed in two parts rigidly secured together, and the operating mechanism is disposed upon these parts relatively as shown. The said mechanism has as its central and essential part a nut tap B, provided with a shank $b$ constructed and arranged to be engaged successively and sometimes simultaneously by two sets of radially disposed jaws, C and D, respectively. These jaws are situated on the same horizontal plane but with their engaging portions one above the other and apart relatively as seen in Figs. 2 and 3, and shown enlarged in Figs. 8 and 9. Said jaws constitute a part of what I generically denominate the chuck or chuck mechanism which includes other parts as well. Thus the shank $b$ of the tap has length sufficient to extend through both sets of jaws and is flattened or otherwise suitably constructed at the points of engagement by said jaws but is formed with shoulders above said flattened portions under which the jaws engage and rest the tap. The tap is wholly supported as well as operated by said jaws, and one set or the other of the jaws is always engaged therewith. To obtain this effect I employ a disk G mounted rotarily about tubular power driven shaft H and having an eccentric channel or groove $g$ on its top. Said shaft H is provided with a head H', Figs. 1 and 2, having a substantially disk shaped flange $h$ about its bottom overlapping disk G and about the bottom of which is rigidly secured a toothed ring J. Another ring, L, is engaged rigidly upon the bottom of disk G and the teeth of both rings project laterally therefrom into the same peripheral plane or vertical plane all around. So it occurs that flange $h$ carries gear ring J, and disk G carries gear ring L, and both are independent and separate in operation.

M and N represent two differential disk shaped gears or wheels, of which the lower one is the larger and mounted on a stud $m$ fixed in or upon main frame A, while the disk or gear N above is the smaller and likewise mounted on stud or plug $m'$ on a reduced extremity thereof off the center of the mounting of gear N beneath, Fig. 10, thus making two different centers of mounting for the said two gears M and N. The gears M and N are connected by a pin $m^2$ working in a slot $n^4$, so that both gears must make equal revolutions. I do not limit myself to this construction. The larger gear might be placed above the smaller if preferable, or the two made equal in diameter and rings J and L of unequal diameters and the result would be practically the same.

Now, following this mechanism in its arrangement and operations, we find a certain direct and uniform rotation imparted to head H' on tubular upright power driven shaft H, and through it a like rotation to toothed ring J and the upper gear M of the two differential gears M and N. This line of mechanism is positive throughout and is designed to reach the channeled or grooved jaw actuating disk G with a difference of rotation as compared with head H' above in such proportion as may be required to cause the jaws C and D to open in pairs and engage the tap alternately above and below the passing threaded and liberated nut, and the head H' has radial slots $h^2$ traversed by the jaw actuating pins $g'$ to cause them to slide in direct lines in said head notwithstanding the rotary travel of the sustaining and operating parts. Obviously if head H' with its radial slots $h^2$ were stationary and disk G were rotated there would be a back and forth movement of jaws C and D according to the outline of channel $g$ in said disk. So also is there a movement corresponding to this in the foregoing mechanism, and differing therefrom only in the fact that the two parts, disk G and head H' are in changing relation to each other according to their difference in speed of rotation. The sum of this difference is expressed in the opening and closing of the sets of jaws C and D alternately in pairs and at such intervals that the nuts are discharged from the tap without stopping the machine or interfering with its work. To do this the said mechanism is constructed and timed to open the upper jaws to pass the nut down while the lower jaws are engaged on the tap, and then the upper jaws are automatically closed and the lower jaws opened to maintain a continuous operation, and the nut is discharged by dropping down off the tap into the space beneath through shaft H. A nut $n'$ is shown as part way down on the tap in Fig. 2, and another nut $n^2$ is shown in the same figure between the sets of jaws. In this relation of parts the upper jaws are open and the lower jaws closed, Fig. 8. In such case, when a set of jaws is open, the said jaws are engaged in the outer or eccentric portions of the irregular channel or groove $g$, as with the upper jaws in Fig. 8, and when said jaws are in the inner or concentric portions of said channel they are closed upon the tap, as with both sets of jaws Fig. 9.

The nut-blanks, $b^2$, are fed to the machine from a fixed or stationary hopper O through a chute or conduit P, so arranged or supported as to receive an agitating movement to carry the blanks forward in the feed channel, and to this end the hopper and blank conduit or chute are wholly separate and independent of each other.

I might of course suggest different mechanisms for agitating the chute P, but in this instance I employ a rod S fixed in or to the bottom of the chute, Fig. 4, and working in an upright sleeve $s$ or other sufficient support fixed on the main frame, and an arm T pivoted at or about its middle on the main frame A engages at one end in a slot in rod S and at the other end is provided with an inclined tooth or projection engaged by a toothed wheel V on power driven shaft W. A set screw $v$ at the bottom of rod S fixes its normal elevation, and its lift is from this point upward, more or less, as needed and through the action imparted to arm T by wheel V. The blanks are thus fed forward into channel $z$ therefor, Fig. 3, leading to the nut-box, and in this channel I place a spring actuated device to cast the blanks with something like a kicking action into the nut-box at the right times and consisting of a finger 3, pivoted at its upper end in the main frame and pressed upon from behind by a fixed spring 5.

A dog or catch 6 engages finger 3 at the top and is itself held down in engaging position on the finger by a spring pressed bolt 7. This or equivalent mechanism may be employed for controlling finger 3 and transferring the blanks from the conduit to the nut-box. Finger 3 acts upon the pressure of its spring 5 when released by the raising of dog 6, and the said dog is lifted against its spring by a lip or projection 9 on plunger 10 as said plunger is raised to admit another blank beneath the same. As plunger 10 descends projection 9 presses finger 3 back to engage the next succeeding blank. Meantime the blanks $b^2$ are detained in transit in the nut-box in readiness for release when the preceding nut has passed well down upon the tap, and when the waiting blank is liberated it is delivered upon the tap and is immediately engaged by the descending plunger or follower 10, to press it down. Detention of blanks $b^2$ is effected and said blanks are handled and delivered through the coöperation of several parts comprising two laterally movable spring pressed blank supports 4 which are laterally movable in or on a substantially cap shaped yoke Y supported upon plunger 10 over a collar 11 thereon, and a spring 12 about the plunger comes between said yoke and collar to give the plunger freedom of play within limits, as will hereinafter be seen. The dogs 4 are entered through lateral openings in yoke Y, and the stationary nut-box B' has a rectangular opening up through its center adapted to receive and hold said blanks from rotation after they have been delivered upon the tap for threading. At its upper portion the said box has opposite slots with lower beveled edges 14 against which the beveled inner extremities of dogs 4 impinge as yoke Y descends with the plunger, and thus said dogs are withdrawn from under nut-blanks $b^2$ and said blank is delivered in a perfectly horizontal position upon or over the initial end of the tap ready to begin cutting. A bore in the lower end of plunger 10 adapts the same to engage over the tap, and the bottom of the plunger is otherwise flat to press the nut-blank down in the feeding process.

By means of spring 12 plunger 10 is permitted to rise sufficiently after yoke Y has reached its upward limit of travel to enable a nut-blank to be fed or cast forward by spring pressed finger 3 upon the waiting dogs 4, where it rests also between the sides of the nut-box, Fig. 2. The slots in this box for dogs 4 form the limit upward for yoke Y as above indicated.

The object of the play between the fork and the plunger is as follows: When the plunger is at its highest point of travel, the opening between the bottom of plunger and the rests 4 which support the blank from below is large enough to receive the blanks regardless of any slight variation in thickness of said blanks, and there is a variation which at times is sufficient to affect the operation of the feeding mechanism. When plunger 10 starts on its downward travel, spring 12 begins to act and draws the blank nut against the bottom of plunger 10 when it is firmly held during the descent of said plunger, and by this means the blanks are caused to be tapped square with their faces regardless of any variation in their thickness. If the yoke and plunger were integral the opening would have to be made large enough to receive the thickest blanks, with the result that a thin blank would be loosely held with no certainty of its being tapped square with its face. Just before the completion of the upward movement of the plunger, the laterally movable nut rests which slide within the slots in the sides of the nut box come into engagement with the end of said slots and check the upward movement of the rests and slightly increase the distance between the end of said plunger and said rests so that blanks of varying thickness may be received.

Now, it is of prime importance that the nut-blanks should be delivered to the tap so that the nut should be tapped square with its face, and by my construction a perfectly true horizontal delivery of the blank to the tap is assured. It will be noticed that the blank is held firmly between the plunger and dogs 4 until it comes well down upon the initial thread of the tap, and as said dogs are withdrawn the plunger bears the blank evenly down over the tap and threading goes on as it should.

To provide against possible accident by feeding the blanks to the tap if the tap be broken or not able to work and to prevent blank-nuts from getting mixed with those already tapped in case of such breakage, I employ an emergency stop or catch 15, pivoted in the blank-box B' and having its straight lower edge portion in position normally to engage against a passing nut on the tap and provided with an emergency tooth or spur 17 at its top to come into the path of the nut-blank as it is pushed or cast forward in channel 2 by finger 3, when danger occurs. If there be no nut on the tap the spring 16 behind stop 15 will throw the stop forward and upward and bring tooth 17 in the path of the blank and arrest its further travel. This or equivalent mechanism may be used for this purpose.

Power is applied to plunger 10 through plunger arm 20 with varying speed of operation as the nature of the work may need and as will appear in the mechanism now to be described. Thus, the plunger arm 20 is pivoted at one end on a projection from main frame A and at the other end is connected to or with the plunger through a compensating mechanism comprising a sliding block 22 set into the end of the plunger and having a cross pin engaged by the open slotted end of the plunger arm. The said member rests upon a spring 23 beneath and is engaged by a set screw 24 from above, so that thereby the said arm may be afforded an adjustable spring pressed engagement with the plunger, and whatever pressure the screw exerts on the plunger will be cushioned by spring 23 and dangerous rigidity is avoided. Screw 24 also regulates the height to which plunger 10 is raised in order to release finger 3, and screw 24 must be used in connection with adjustable wrist pin 27 to regulate and control the different movements. Power is conveyed to arm 20 by connecting rod 25, which has a head with a transverse slot 26 in which is adjustably engaged the wrist pin 27 on crank 28, and in which also there is a slot or space 26' for adjustment of said pin 27 to give more or less elevation or throw to arm 20 according to the thickness of the nut to be tapped or other conditions. Upon the shaft 30 carrying said crank mechanism I place a friction cone 31 and engage a friction disk 32 therewith and which is slidable on a splined counter shaft 33 to give greater or less speed to the feed mechanism for the nut-blank exerted through plunger 10 according as greater or less speed is desired in tapping nuts of different sizes or of different pitch of thread. A threaded adjusting rod 36 is provided for disk 32 and has an arm 37 engaged upon the hub of said disk and serves to fix the working position of the disk in respect to cone 31, and the shafts 30 and 33 are at such angle in relation to each other as to bring the plane of shaft 33 parallel to the working surface of cone 31. Friction cone 31 is slidably adjustable on its shaft by means of a differentially threaded screw 39. By this means any wear of disk 32 can be taken up.

The shaft 33 is operated from power driven shaft W by a worm gear 40 thereon engaging a gear 41 on splined shaft 33, and it is through this line of mechanism, beginning with worm 40 and running through the several friction members 31 and 33 and operating rod 25 and arm 20 that the plunger or follower 10 has its action and degree of movement up and down as its speed of operation.

Again it is obvious, also, that there are various mechanisms which could be devised to communicate power in the manner substantially which has just been described, so that I do not consider myself as limited to these exact means but may employ any and all mechanical equivalents thereof.

What I claim is:—

1. In a nut tapping machine, a rotatable support and two pairs of chuck jaws mounted to slide radially thereon, a rotatable cam member operatively engaged with said jaws having concentric portions adapted to hold both pairs of jaws in closed positions at one time and at successive intervals and eccentric portions adapted to open each pair of jaws alternately and means to rotate said jaw-support and said cam member at different speeds.

2. In a nut tapping machine, two separate sets of jaws and a rotatable head in which said jaws are slidably supported on radial lines, a cam member and means affixed to said jaws engaged with said cam member, in combination with mechanism interposed between said head and cam member for moving the cam member by means of the head and relative thereto, substantially as described.

3. In a nut tapping machine, a head and two different sets of chuck jaws slidably supported therein, a cam member engaged by said jaws, teeth about the peripheries of said head and cam member, differential gears connected to rotate together and engaged respectively with said head and cam member, and power connections to said head, substantially as described.

4. In a nut tapping machine, a plunger to press the nut upon the tap and a set of oppositely arranged laterally movable supports for the nut-blank beneath the plunger, and means to carry said supports engaged on the plunger and said means being movable relatively to the plunger and a spring therefor adapted to force the same upward, whereby the nut-blank is clamped between the plunger and said supports for the nut-blanks.

5. In a nut tapping machine, a plunger and a yoke engaged upon the lower portion thereof, and a pair of opposite laterally movable supports for the nut-blank, the said yoke being slidably engaged on the plunger and a spring to force the said yoke upward and means to retard the upward movement of said yoke during an upward movement of said plunger.

6. In a nut tapping machine, a plunger and a slidable yoke on the lower end thereof, opposite laterally movable supports for the nut-blank in said yoke beneath the end of the plunger, means to operate said yoke relatively to said plunger to clamp the blank against the bottom of said plunger, and means to engage said supports to release the blank.

7. In a nut tapping machine, a plunger and a set of laterally movable spring pressed rests for a nut-blank supported therefrom beneath the end of the plunger, means to cause the plunger to descend, means to open said spring pressed rests laterally and disengage the nut, and means to cause the rests to clamp the blank against the bottom of said plunger upon its initial downward movement.

8. In a nut tapping machine, a box to receive the nut-blanks, a plunger to traverse said box and a set of spring pressed rests for the said blanks supported from the lower end of said plunger and adapted to move laterally in respect thereto, means to press said rests against their springs and release the blank, and means to raise and lower said rests in respect to the end of said plunger.

9. In a nut tapping machine, a box for the nut-blanks and a spring pressed device to deliver the blanks to said box, and a stop to arrest the action of said device having a part adapted to bear against the blanks within said box and having a part adapted to engage incoming blanks, said stop being normally out of action by reason of engagement with the blanks within said box.

10. In a nut tapping machine, means to stop the feeding of blanks in certain contingencies, said means comprising a box to receive the nut-blanks and a channel leading thereto, and a stop adapted to bear against the blanks within said box and having a part to engage the incoming blanks, and means to actuate said stop to throw said part in the path of the incoming blanks when said box is emptied of its blanks.

11. In a nut tapping machine, a plunger and a spring pressed yoke slidably mounted upon the lower end thereof, nut engaging rests movably supported upon said yoke, and means to engage said yoke to retard its upward movement during a continuing upward movement of said plunger and means to force the yoke upward to clamp the blank nut between the end of said plunger and the said movable rests of said yoke upon a downward movement of said plunger.

12. A box to receive the blanks having a passage within which the lower part of the plunger travels while conveying the blanks to and upon the tap, a plunger having a spring pressed yoke slidably affixed to its lower end and laterally movable rests on said yoke, means to engage said rests upon the upward movement of the plunger, and means to operate the rests to clamp the blank received against the bottom of the plunger.

13. In a nut tapping machine, a nut box having a passage for a plunger, a plunger traversing said passage to convey the nut blanks to and upon the tap, a yoke slidably affixed to the lower end of said plunger, and laterally movable nut rests carried by said yoke, stops to engage said nut rests and hold them in position to receive the blanks and means to engage said rests and cause them to release the blanks.

14. In a nut tapping machine, a nut box having a plunger passage to and over the tap and a reciprocating plunger therein, a channel through which blanks are fed to said plunger passage beneath said plunger, a spring pressed feed device adapted to engage the blanks in said channel to feed the same forward, a lock adapted to hold said device in check and means on said plunger adapted to engage said device and said lock alternately to set and release said device by the opposite movements of said plunger.

15. In a nut tapping machine, a chuck comprising two sets of slidable jaws and a rotatable head upon which said jaws are radially supported, in combination with a rotatable member connected with said head and having an eccentric cam portion engaged with said jaws and adapted to positively open and close said sets of jaws successively, and a concentric cam portion adapted to positively hold each set of jaws in closed position successively and both sets of jaws in closed position simultaneously and temporarily, and means to rotate said head and said member at different speeds.

In testimony whereof I sign this specification in the presence of two witnesses.

FREDERICK C. TYLER.

Witnesses:
R. B. MOSER,
C. A. SELL.